US012589939B2

(12) United States Patent

Kumar et al.

(10) Patent No.: US 12,589,939 B2

(45) Date of Patent: Mar. 31, 2026

(54) EQUIPMENT ASSET WITH LIQUID RUNOFF CHARGE CONTROL

(71) Applicant: Transportation IP Holdings, LLC, Norwalk, CT (US)

(72) Inventors: Ajith Kuttannair Kumar, Ashburn, VA (US); Bret Worden, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 170 days.

(21) Appl. No.: 18/458,772

(22) Filed: Aug. 30, 2023

(65) Prior Publication Data

US 2024/0101344 A1     Mar. 28, 2024

Related U.S. Application Data

(60) Provisional application No. 63/377,231, filed on Sep. 27, 2022.

(51) Int. Cl.
B65D 90/46 (2006.01)
B60L 5/38 (2006.01)

(52) U.S. Cl.
CPC .............. B65D 90/46 (2013.01); B60L 5/38 (2013.01); *B65D 2590/22* (2013.01)

(58) Field of Classification Search
CPC ....... B65D 90/46; B65D 2590/22; B60L 5/38; Y02T 10/70; Y02T 10/7072; B62D 25/07
USPC ......................................................... 361/212
See application file for complete search history.

(56) References Cited

U.S. PATENT DOCUMENTS

| | | | | | |
|---|---|---|---|---|---|
| 5,584,369 | A | * | 12/1996 | Makino | ..................... B60L 5/22 |
| | | | | | 191/55 |
| 2002/0174889 | A1 | * | 11/2002 | Shugar | ................... B60L 8/003 |
| | | | | | 136/251 |
| 2015/0283906 | A1 | * | 10/2015 | Glinka | ...................... B60L 5/22 |
| | | | | | 191/55 |

(Continued)

FOREIGN PATENT DOCUMENTS

| | | |
|---|---|---|
| CA | 2888311 A1 | 4/2014 |
| EP | 0605214 A2 | 7/1994 |
| EP | 2979917 A2 | 2/2016 |

OTHER PUBLICATIONS

J. P. Reilly and M. Cwiklewski, "Rain Gutters Near High-Voltage Power Lines: A Study of Electric Field Induction," in IEEE Transactions on Power Apparatus and Systems, vol. PAS-100, No. 4, pp. 2068-2081, Apr. 1981 (Year: 1981).*

(Continued)

*Primary Examiner* — Sreeya Sreevatsa

(74) *Attorney, Agent, or Firm* — K&L Gates LLP

(57) ABSTRACT

An equipment asset may include a body, one or more current collector rails, and a grounding element. The body may have a top side and a power transfer zone. The power transfer zone may include at least an electrically non-conductive top surface. The one or more current collector rails may be mounted to the top side of the body within the power transfer zone. The grounding element may be electrically conductive and disposed on the top side of the body. The grounding element may surround the power transfer zone and be spaced apart from the one or more current collector rails. The grounding element may receive liquid that is runoff from the power transfer zone and electrically ground charged portions of the liquid.

18 Claims, 5 Drawing Sheets

(56)          References Cited

U.S. PATENT DOCUMENTS

2016/0031337 A1 *   2/2016  Li  ........................... B60L 5/39
                                                   320/109

OTHER PUBLICATIONS

Extended European Search Report for related EP App. 23196479.2 dated Jan. 30, 2024 (8 pages).

* cited by examiner

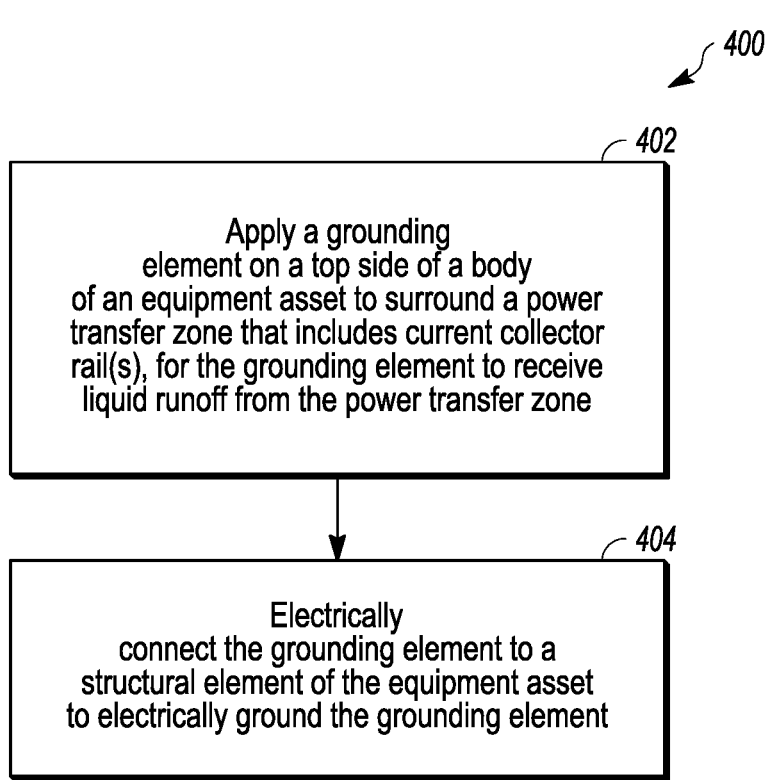

*400*

*402*

Apply a grounding
element on a top side of a body
of an equipment asset to surround a power
transfer zone that includes current collector
rail(s), for the grounding element to receive
liquid runoff from the power transfer zone

*404*

Electrically
connect the grounding element to a
structural element of the equipment asset
to electrically ground the grounding element

*FIG. 7*

EQUIPMENT ASSET WITH LIQUID RUNOFF CHARGE CONTROL

CROSS-REFERENCE TO RELATED APPLICATIONS

This application is a is a non-provisional conversion of, and claims priority to, U.S. Provisional Patent Application No. 63/377,231, which was filed on Sep. 27, 2022, and the entire disclosure of which is incorporated herein by reference.

BACKGROUND

Technical Field

Embodiments of the subject matter herein relate to equipment assets, such as vehicles and stationary industrial equipment, that transfer electrical power with other equipment assets.

Discussion of Art

Some industrial equipment assets receive power from external power sources. Such equipment assets include electric vehicles that use batteries to power motors for generating tractive effort. Battery-powered equipment assets discharge power from the batteries during operation of the equipment assets, and the batteries have to be periodically recharged for future operations. Although regenerative braking, photovoltaic cells, and other techniques can be implemented to harness some energy for recharging the batteries, the equipment assets in industrial and/or transportation settings typically have to receive power from an external power source to reach a target voltage or energy level for sustained and reliable operation. The external power source may be or include a wayside rail, an overhead catenary line, a stationary charging station, or the like. The electrical connection may be established between current collector rails disposed onboard the equipment asset and corresponding conductor bars of the external power source.

The current collector rails may be disposed along an exterior of the equipment asset to provide easy access to the conductor bars of the external power source. There may be liquid in the vicinity of the electrical connection. Examples of liquid may be water surface runoff from rain, snow, dew or condensation, or other types of precipitation. The liquid may include contaminants that increase the electrical conductivity of the liquid. For example, in some applications, iron ore dust on a surface of the equipment asset may mix with the rainwater to form an electrically conductive liquid on the surface of the asset. If that conductive liquid is exposed to electric current from the high voltage power transfer between the asset and the external power source, the conductive liquid may become an ungrounded charged liquid that could pose a shock risk. It may be desirable to have a system and method that differs from those that are currently available and provides charge control of liquid runoff to avoid the shock risk.

BRIEF DESCRIPTION

In accordance with one example or aspect, an equipment asset is provided that includes a body, one or more current collector rails, and a grounding element. The body has a top side and a power transfer zone. The power transfer zone includes at least an electrically non-conductive top surface.

The one or more current collector rails are mounted to the top side of the body within the power transfer zone. The grounding element is electrically conductive and disposed on the top side of the body. The grounding element surrounds the power transfer zone and is spaced apart from the one or more current collector rails. The grounding element is configured to receive liquid that is runoff from the power transfer zone and to electrically ground charged portions of the liquid.

In accordance with one example or aspect, an equipment asset is provided that includes a body, one or more current collector rails, and a grounding element. The body has a top side and a power transfer zone. The power transfer zone includes at least an electrically non-conductive top surface. The one or more current collector rails are mounted to the top side of the body within the power transfer zone. The grounding element is electrically conductive and disposed on the top side of the body. The grounding element surrounds the power transfer zone and is spaced apart from the one or more current collector rails. The grounding element includes a gutter that can receive liquid that is runoff from the power transfer zone and to direct the liquid to one or more drains that direct the liquid away from the gutter and the top side of the body. The grounding element is spaced apart from perimeter edges of the top side of the body such that an insulated boundary area of the top side is disposed between the grounding element and the perimeter edges of the top side.

In accordance with one example or aspect, a method (e.g., for grounding liquid runoff) is provided that includes applying a grounding element on a top side of a body of an equipment asset. The grounding element is applied to surround a power transfer zone that includes at least an electrically non-conductive top surface. The equipment asset includes one or more current collector rails mounted to the top side of the body within the power transfer zone. The grounding element is applied such that the grounding element is spaced apart from the one or more current collector rails to receive liquid that is runoff from the power transfer zone to electrically ground charged portions of the liquid.

BRIEF DESCRIPTION OF THE DRAWINGS

The subject matter may be understood from reading the following description of non-limiting embodiments, with reference to the attached drawings, wherein below:

FIG. 7 is a flow chart of a method for grounding liquid runoff according to an embodiment.

DETAILED DESCRIPTION

Figure 1:
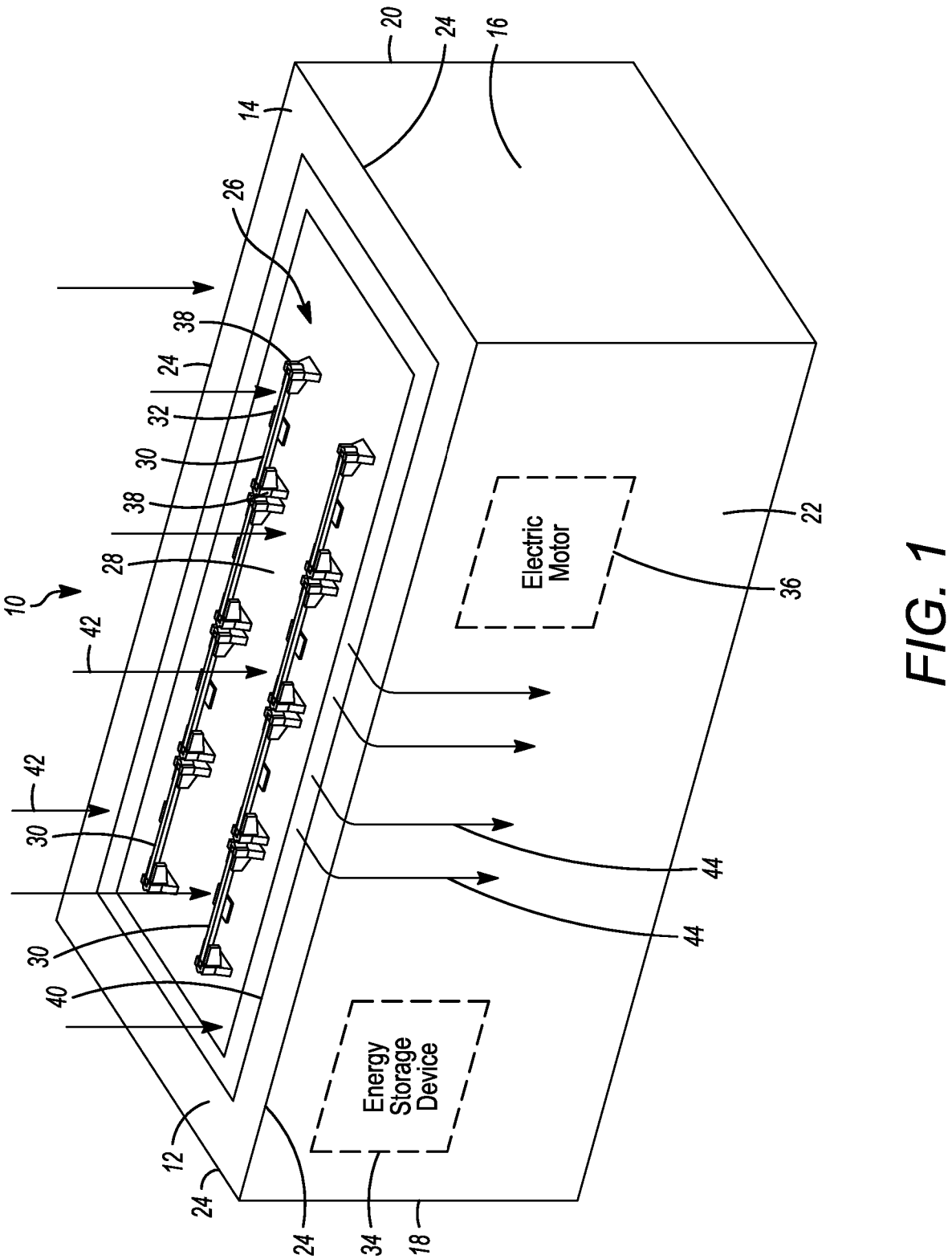
FIG. 1 illustrates a perspective view of an equipment asset with liquid runoff charge control according to an embodiment.

Embodiments of the subject matter described herein relate to controlling potentially charged portions of liquid runoff on an equipment asset to mitigate the risk of shock. In various embodiments described herein, the charge control is provided by surrounding a power transfer zone or area with a grounding element along a surface of the equipment asset. The power transfer zone may include power equipment, such as current collector rails, for establishing a mated electrical connection with an external power system. The liquid runoff may flow in or on the grounding element, which grounds any charged portions of the liquid before the liquid can flow to surfaces which might contact any people or animals. The grounded liquid poses no threat of electrical shock, so the grounding element mitigates the risk of shock. For example, the liquid runoff may flow across the grounding element along a top side of the equipment asset before the liquid flows down one or more sides of the equipment asset. The liquid is grounded prior to reaching the one or more sides of the equipment asset, so a person that touches a wet side of the asset will not receive an electrical shock.

In one or more other embodiments, the charge control may be provided by collecting and steering the flow of potentially charged liquid runoff away from surfaces of the asset that may be contacted by people, animals, or other bodies that could be harmed or damaged by electrical shock. For example, the equipment asset may include a gutter that surrounds the power transfer zone of the asset and collects the liquid runoff from the power transfer zone. The gutter may direct the potentially charged liquid runoff through one or more drain pipes and/or conduits to a location that is away from potential human and animal contact surfaces. For example, the pipes and/or conduits may deposit the liquid runoff onto the ground, which electrically grounds the liquid, or may collect the liquid within a reservoir. Optionally, at least a portion of an inner surface of the gutter and/or associated conduits may be electrically conductive to function as a grounding element that electrically grounds the liquid runoff prior to depositing the liquid.

The equipment asset described herein may be a vehicle. The vehicle may be a rail vehicle (e.g., locomotive), a mining vehicle, a bus, a semi-truck, an agricultural vehicle, construction vehicles, or the like. These vehicles may be powered at least in part by electrical energy storage systems, such as battery packs. These vehicles may be exposed to metal contaminants, such as iron ore dust, that can increase the electrical conductivity of moisture on the surfaces of the vehicles, enabling the liquid mixture to be charged by the high voltage power transfer elements onboard the vehicles. The embodiments described herein are applicable to other types of vehicles as well, such as automobiles, pickup trucks, marine vessels, aircraft, and/or other off-highway vehicles. In one or more alternative embodiments, the equipment asset described herein may be non-vehicular stationary industrial assets, such as machinery. Examples of such stationary industrial assets may include off-board charging systems that supply electrical power to electric vehicles, cranes, gantries, and other industrial machinery.

FIG. 1 illustrates a perspective view of an equipment asset 10 with liquid runoff charge control according to an embodiment. The equipment asset includes a body 12 (e.g., an asset body, housing, etc.) that has a top side 14. The equipment asset is generically illustrated in FIG. 1 to have a box-like shape, but may represent any type of moving or stationary equipment asset, such as a rail vehicle, a bus, a mining vehicle, or the other types of assets listed above. For example, the equipment asset may be a vehicle, and the top side of the body may be the roof of the vehicle. In the illustrated embodiment, the body includes a front side 16, a back side 18, a first end side 20 (e.g., left side), and a second end side 22 (e.g., right side), which all extend from perimeter edges 24 of the top side.

The body of the equipment asset includes a power transfer zone or area 26 along the top side. The power transfer zone features at least an electrically non-conductive top surface 28. The electrically non-conductive top surface may be defined by a non-conductive (e.g., conventional) sealant material that coats an underlying material which structurally forms the top side of the body. The sealant material may be paint, epoxy, or the like. The underlying material may be metal, wood, or the like. Alternatively, the non-conductive top surface may be defined by the surface of an electrically non-conductive material that structurally forms the top side, such as a plastic or carbon fiber material.

One or more current collector rails 30 are mounted to the top side of the body within the power transfer zone. The current collector rails are designed and positioned to removably contact complementary conductor bars of an external power system to establish an electrical connection between the equipment asset and the external power system. The current collector rails may be electrically couplable to at least one of an energy storage device 34 on the equipment asset or an electric motor 36 on the equipment asset. The current collector rails may receive electrical power from the external power system to charge the energy storage device and/or power the electric motor. The energy storage device may include a battery pack, capacitors, and/or the like, for storing and selectively discharging electrical energy. The current collector rails may be electrically connected via a first wired connection of one or more wires, cables, or the like to the energy storage device. During a charging operation, the current collector rails may receive electrical power from the external power system, which is conveyed via the first wired connection to the energy storage device to charge the energy storage device. The current collector rails may be electrically connected via a second wired connection of one or more wires, cables, or the like to the electric motor. Optionally, the current collector rails may receive electrical power from the external power system, which is conveyed via the second wired connection to the electric motor to power the electric motor.

The equipment asset may include a control circuit (e.g., controller) and switch devices along electrically conductive pathways defined by the first and second wired connections. The control circuit may selectively operate the switch devices to control the electric current between the current collector rails, the energy storage device, and the electric motor. For example, the control circuit may direct electrical power received from the external power system via the current collector rails to the energy storage device to charge the energy storage device. The control circuit may subsequently control the switch devices to cause the energy storage device to discharge electric current for powering the electric motor and/or other loads of the equipment asset. When the equipment asset is a vehicle, the electric motor may generate tractive effort for propelling the vehicle along a route. The vehicle may include multiple energy storage devices and/or multiple electric motors.

The equipment asset includes a set of multiple current collector rails in the illustrated embodiment. Each current collector rail may include an elongated bar 32 between two mounting features 38. These features typically provide electrical insulation between the conducting rail or contacts and the surface of the vehicle. These insulating mounts, and potentially the surface to which they mount, are typically dielectric in function. This is desirable to avoid ground faults when these surfaces are wet with rain, dew condensate or snow melt, or contaminated with dirt, dust, and/or conducting particles such as iron ore dust. While this insulation function is needed it also allows for the possibility of a stream of conducting fluid to drain down the side of the vehicle. The elongated bar may be suspended above the non-conductive top surface of the power transfer zone by the mounting features. The current collector rails may have an arrangement that complements the arrangement of conductor bars of the external power system. In the illustrated configuration, the collector rails are arranged in two parallel rows of four rails per row. The power transfer zone of the asset may have a different number of current collector rails and/or a different arrangement of the current collector rails in alternative embodiments. The current collector rails may be fixed in place on the top side of the asset. In an alternative embodiment, the current collector rails may be mounted on a movable frame, such as a pantograph. The movable frame may enable the current collector rails to extend and retract relative to the top side of the asset. As such, the current collector rails may be the electrically conductive contacts of a pantograph.

The equipment asset includes a grounding element 40 that is disposed on the top side of the body. The grounding element surrounds the power transfer zone. For example, the grounding element may continuously extend around an entire perimeter of the power transfer zone without breaks or gaps in the grounding element. The grounding element may have a closed shape, such that the grounding element forms an enclosed figure whose line segments and/or curves are connected and meet to enclose the power transfer zone. The grounding element may be spaced apart from the current collector rails such that the grounding element does not contact the current collector rails. For example, portions of the non-conductive top surface may be disposed in intervening spaces between the current collector rails and the grounding element. The grounding element in the illustrated embodiment is a rectangular strip that borders the power transfer zone. The rectangular strip has right angle corners and linear sides in FIG. 1, but may have other shapes in other embodiments, some of which are shown and described herein. For example, the grounding element may be rectangular with rounded corners and/or curved sides, oval, elliptical, circular, hexagonal, square with rounded corners and/or curved sides, and/or the like.

The grounding element is designed to receive liquid that is runoff from the power transfer zone. For example, moisture on the non-conductive top surface of the power transfer zone may physically contact, such as flow onto and/or in, the grounding element before the moisture contacts any other portion of the equipment asset outside of the power transfer zone. The grounding element is designed to electrically ground charged portions of the liquid, to avoid the risk of shock. The grounding element is at least partially electrically conductive, and is grounded. For example, the grounding element may be electrically connected to a grounded structural element of the equipment asset.

FIG. 1 illustrates an example scenario in which rain is falling on the top side of the equipment asset. For example, the arrows 42 pointed straight downward represent rain drops. The water within the power transfer zone may be electrically conductive attributable to mixing with electrically conductive contaminants, such as metal dust. During a power transfer operation in which electrical power is being transferred to or from the equipment asset through the current collector rails, some of the current may charge the water that is present in the power transfer zone. Due at least in part to gravity, motion, or wind, at least some of the charged water runoff within the power transfer zone may flow outward towards one or more of the perimeter edges of the equipment asset before cascading off the edges, as shown by the arrows 44 in FIG. 1. Prior to reaching the perimeter edges, the water runoff flows onto and across the grounding element. More specifically, the water may physically contact at least one electrically conductive surface of the grounding element. The contact between the water runoff and electrically conductive surface of the grounding element electrically grounds the charged portions of the water runoff. The water that cascades over the perimeter edges of the top side of the asset is grounded due to the grounding element, and therefore is safe to touch without risk of shock. For example, a person can touch a surface along the left or right sides of the equipment asset, which is wet from the water runoff from the top side, during the active power transfer operation without risk of being shocked.

Figure 2:
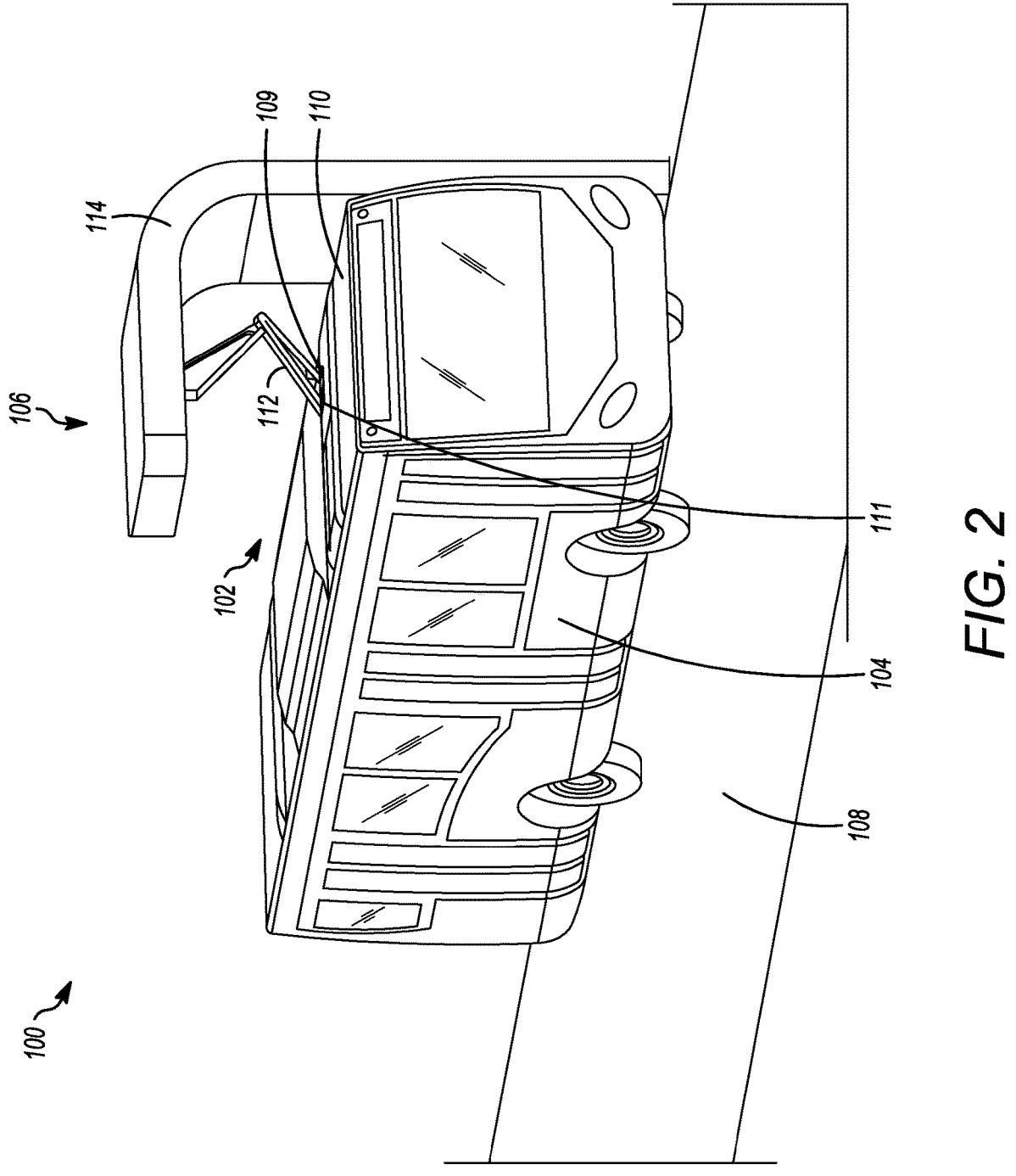
FIG. 2 is a perspective view of a power transfer system according to an embodiment.

FIG. 2 is a perspective view of a power transfer system 100 according to an embodiment. The power transfer system includes a vehicle power assembly 102 disposed onboard a vehicle 104 and an off-board power assembly 106 of an external power system 114. The vehicle in FIG. 2 is an example of the equipment asset shown in FIG. 1. The vehicle may be a bus that travels on a route 108, such as a road. The external power system may be a stationary structure (e.g., monument) located along a side of the route. The vehicle moves relative to the external power system as the vehicle travels along the route. In the illustrated embodiment, the vehicle stops at the external power system to receive electrical power from the external power system for powering the vehicle. For example, the received electrical power may be used to recharge one or more batteries of an energy storage device of the vehicle. The external power system may include a power source, such as an electrically conductive connection to an electrical grid or network, one or more batteries, or the like.

The vehicle power assembly may include at least one set of current collector rails 109 on a top side 110 of the vehicle. The external power system may include at least one set of current conductor bars 111. The current conductor bars may be held by at least one frame 112 of the external power system. The frame and the conductor bars may be components of a pantograph of the external power system. When the vehicle stops within a designated stopping window (e.g., range) relative to the external power system, the current collector rails onboard the vehicle align with and electrically connect to corresponding current conductor bars of the external power system to establish a closed conductive pathway between the vehicle and the external power system. With the closed conductive pathway established, power transfer may occur from the external power system to the vehicle, or from the vehicle to the external power system.

The vehicle in FIG. 2 may have the liquid runoff charge control as described with reference to FIG. 1. For example, the vehicle may include a grounding element that surrounds a power transfer zone, including the current collector rails, along the top side of the vehicle. The grounding element collects and/or electrically grounds liquid runoff from the power transfer zone, to prohibit the risk of shock from charged portions of the liquid runoff which flows over the edges of the top side of the vehicle. The vehicle in FIG. 2 is merely one type of vehicle that may represent the equipment asset described herein.

Figure 3:
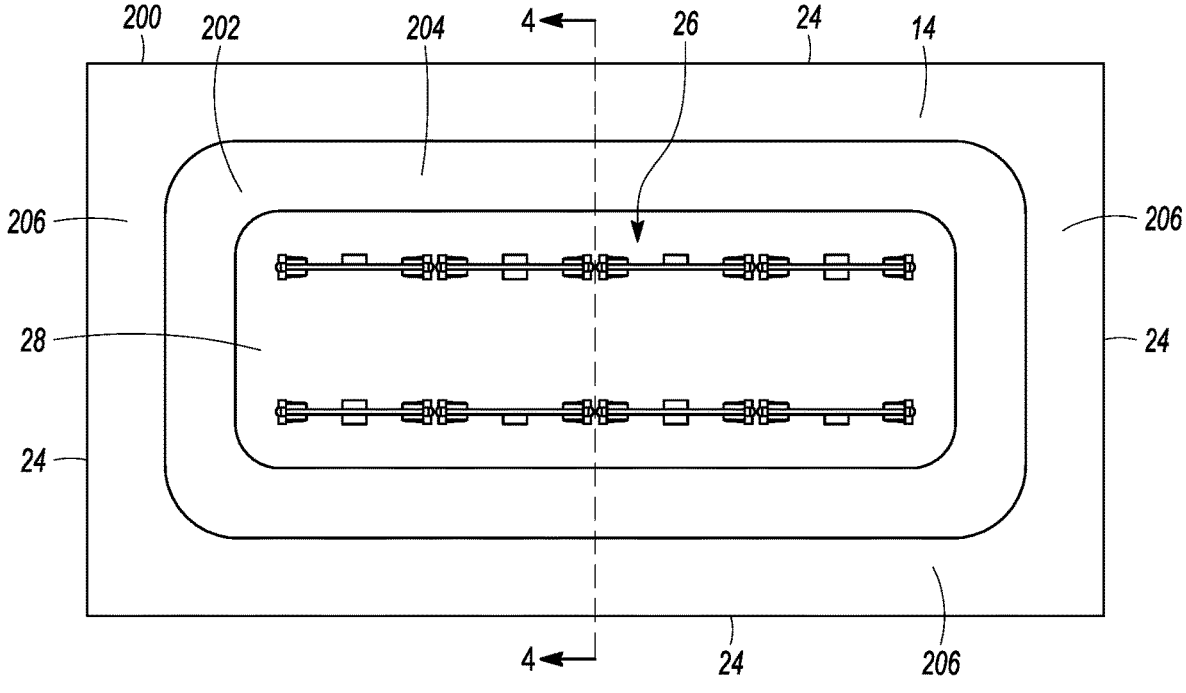
FIG. 3 is a plan view of an equipment asset with liquid runoff charge control according to an embodiment.

FIG. 3 is a plan view of an equipment asset 200 with liquid runoff charge control according to an embodiment. The equipment asset 200 may represent the equipment asset shown in FIG. 1. For example, the equipment asset in FIG. 3 includes a grounding element 202. In an embodiment, the only difference between the equipment asset in FIG. 1 and the equipment asset in FIG. 3 is the size and shape of the grounding elements. The grounding element in FIG. 3 has a wider strip than the grounding element in FIG. 1. The grounding element in FIG. 3 is rectangular with rounded corners, rather than the right angle corners of the grounding element in FIG. 1. The functions of the grounding elements in FIGS. 1 and 3 may be the same. The other components of the equipment asset may be the same as in FIG. 1, so the same reference numbers are used in FIG. 3 as in FIG. 1 for all components except for the equipment asset and the grounding element.

In an embodiment, the grounding element includes a thin, flat layer 204 of material. The material may be a metal material or an electrically conductive polymer material. Suitable metal materials may include stainless steel, copper, aluminum, and the like. The electrically conductive polymer may be a conductive paint, conductive epoxy, or the like, which adheres to and coats the non-conductive top surface to define the grounding element. The polymer may be electrically conductive due to the presence of metallic filler materials embedded within a polymer base material. The metallic filler materials may be metal flakes, powder, or the like. Alternatively, the polymer may be manufactured to have inherent electrical conductivity without the addition of filler particles. In an example, the grounding element may be a conductive sheet, a mesh, or a panel. The element may be a material that is electrically conductive and defines at least part of an upper surface of the grounding element that is exposed along the top side of the equipment asset. For simplicity, the metal sheet example will be discussed in more detail. As a result of the placement of the metal sheet, liquid runoff from the power transfer zone flows from the non-conductive top surface of the power transfer zone onto the metal upper surface of the grounding element, and is electrically grounded before reaching the perimeter edges. The metal sheet may be secured to the top side of the asset via adhesive, mechanical fasteners, and/or the like.

In an embodiment, the grounding element is spaced apart from the perimeter edges of the top side of the body. For example, the top side may have an insulated boundary area 206 disposed between the grounding element and the perimeter edges of the top side. The grounding element surrounds the power transfer zone, and the insulated boundary area surrounds the grounding element. The insulated boundary area has an electrically non-conductive top surface, such that the top surface is dielectric (e.g., electrically insulative). The non-conductive top surface of the insulated boundary area may be defined by a polymeric paint, epoxy, or the like (that is not embedded with conductive filler materials). The non-conductive top surface of the insulated boundary area may be the same composition as the non-conductive top surface of the power transfer zone. In an embodiment, a single type of non-conductive paint or sealant is used to coat the entire top surface of the equipment asset, and the grounding element is applied on top of the paint or sealant to delineate the power transfer zone and the insulated boundary area. The top side of the equipment asset may not include the insulated boundary area in an alternative embodiment. For example, the grounding element may extend to the perimeter edges.

Figure 4:
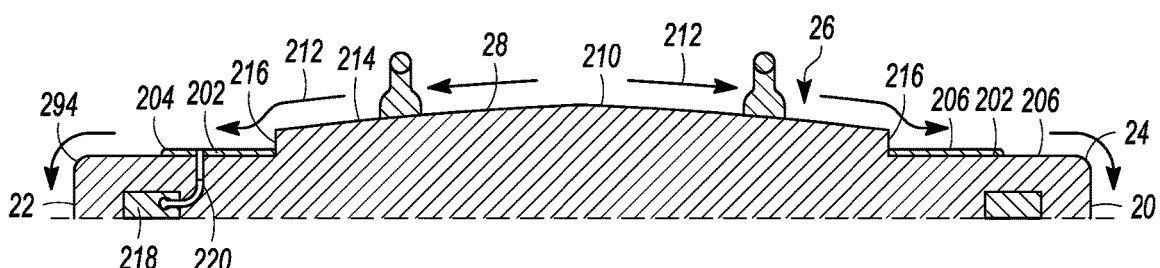
FIG. 4 is a side cross-sectional view of the equipment asset taken along the line 4-4 in FIG. 3.

FIG. 4 is a side cross-sectional view of the equipment asset taken along the line 4-4 in FIG. 3. In an embodiment, the power transfer zone is at least partially convex to direct the liquid that is within the power transfer zone away from a defined center of the power transfer zone and outward towards the grounding element that surrounds the power transfer zone. The convex power transfer zone may prohibit water and other liquids from pooling on the non-conductive top surface of the power transfer zone. The liquid flow is represented by the arrows 212 in FIG. 4. The liquid flows in both directions away from the defined center (or apex), onto and across the grounding element, and then onto and across the insulated boundary area (if present) before cascading over the perimeter edges onto sides of the equipment asset. Although not shown in the illustrated cross-section, the convex power transfer zone may taper in all directions from the defined center.

The cross-sectional view shows the flat, thin layer of the grounding element from the side. Two strips or portions of the grounding element are visible in FIG. 4. Each strip has a width (from left to right in the illustrated orientation) and a thickness (in the vertical direction). The width may be between about 1 inch and 1 foot (e.g., between about 2 cm and 30 cm). The thickness may be substantially smaller than the width. For example, the thickness may be between about 0.04 inches and 0.5 inch (e.g., between about 1 mm and 13 mm). In an embodiment in which the grounding element is a coating of conductive paint or sealant, the strips may be thinner than another embodiment in which the grounding element is a sheet of metal. The grounding element may be low profile due to the thin dimension, which allows the grounding element to avoid contributing to drag on a vehicle and/or adding significant weight to the equipment asset.

In an embodiment, the grounding element is vertically disposed below the power transfer zone along the top side of the body. For example, the non-conductive top surface along the power transfer zone may be raised above an upper surface 206 of the grounding element. For example, the power transfer zone may be stepped above the grounding element and the insulated boundary area, along a raised section 214 of the top side. The raised section projects upward beyond the grounding element, as indicated by vertical walls 216 that form a boundary of the raised section. In an alternative embodiment, the grounding element is not recessed below the power transfer zone.

The grounding element may be grounded via an electrical connection to a structural element 218 of the equipment asset. The structural element is grounded, so the electrical connection between the grounding element and the structural element grounds the grounding element. The structural element of the equipment asset may be a component of the chassis, or structural framework, of the equipment asset. The chassis is grounded. The grounding element may be electrically connected to the structural element via at least one electrically conductive ground strap 220. The ground strap may include or represent one or more cables, wires, fasteners, rods, plates, and/or the like. The structural element in the illustrated embodiment is disposed below the top side. For example, the structural element may be a beam that structurally supports the top side.

Figure 5:
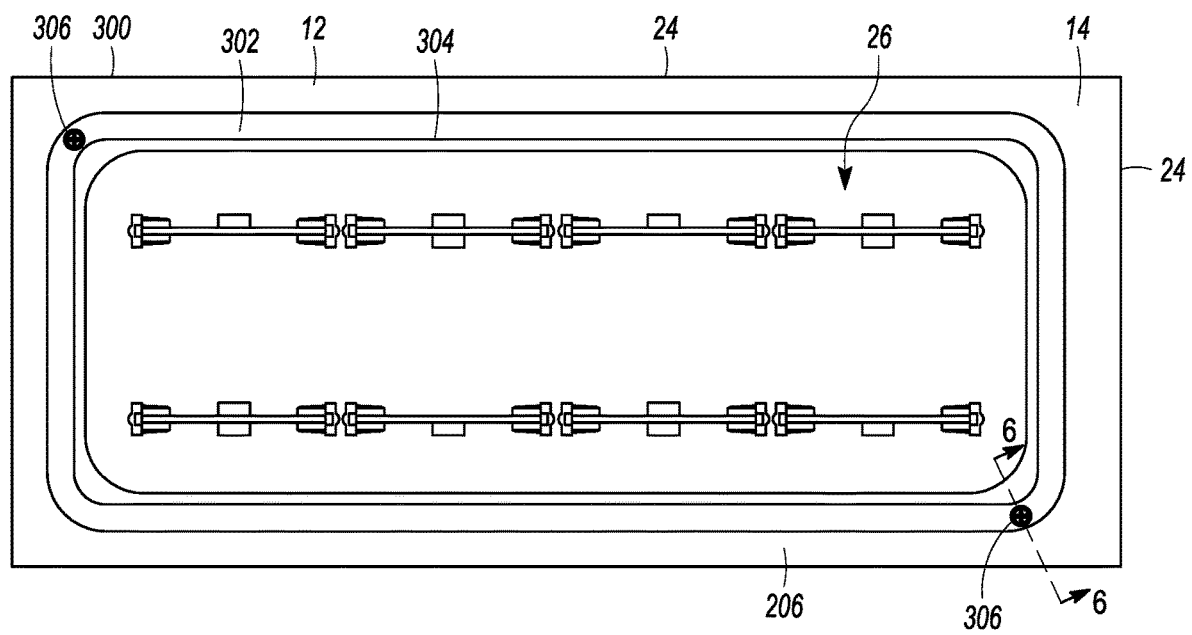
FIG. 5 is a plan view of an equipment asset according to another embodiment.

FIG. 5 is a plan view of an equipment asset 300 according to another embodiment. The equipment asset 300 may represent the equipment asset shown in FIG. 1. For example, the equipment asset in FIG. 5 includes a grounding element 302. In an embodiment, the only difference between the equipment asset in FIG. 1 and the equipment asset in FIG. 5 is the grounding elements. The other components of the equipment asset may be the same as in FIG. 1, so the same reference numbers are used in FIG. 5 as in FIG. 1 for all components except for the equipment asset and the grounding element.

The grounding element 302 includes a gutter 304 installed to receive the liquid that is runoff from the power transfer zone on the top side of the body. The gutter may fully surround the entire perimeter of the power transfer zone without any breaks. The gutter may have a similar top-down shape as the grounding elements shown in FIGS. 1 and 3. The gutter may direct the liquid to one or more drains 306 coupled to the gutter. Two drains are shown in FIG. 5, but the grounding element may have only one drain or at least three drains in another embodiment. The drains direct the liquid away from the gutter and the top side of the body.

Figure 6:
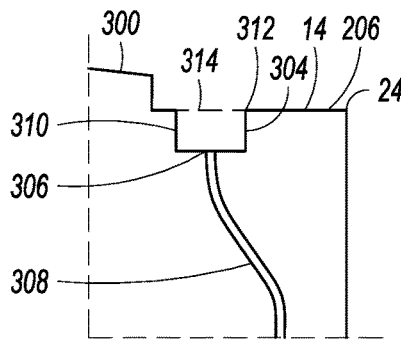
FIG. 6 is a cross-sectional view of a portion of the equipment asset taken along line 6-6 in FIG. 5.

FIG. 6 is a cross-sectional view of a portion of the equipment asset taken along line 6-6 in FIG. 5. The cross-section extends through the gutter and one of the drains. The drains may be connected to associated drainage conduits 308 that receive the liquid from the drains. The drainage conduits may include one or more tubes, hoses, pipes, and/or the like. The drainage conduits may route the liquid runoff from the gutter to a designated location. For example, the drainage conduits optionally may discharge the liquid into a reservoir, to be used for cooling or the like. In another example, the drainage conduits may discharge the liquid onto the ground at a location that would not interfere with normal operation of the equipment asset or typical activities of people around the equipment asset.

As shown in FIG. 6, the gutter may be embedded within the top side, such that part of the gutter housing 310 of the gutter is recessed below the top side. A top edge 312 of the gutter may be flush with the top surface of the top side on one or both sides of the gutter. As such, liquid on the top surface that flows off the power transfer zone may fall into the gutter without flowing to the perimeter edges. The gutter optionally may include a screen or filter 314 to block debris from entering the gutter and clogging the drain(s). The screen may include openings sized to permit liquid to flow through the openings into the gutter without permitting larger debris to enter the gutter, such as sticks, leaves, coal, and/or the like. The screen may be flush with, or recessed below, the top surface of the asset surrounding the gutter to allow the liquid to enter the gutter without pooling. In an embodiment, the gutter is radially interior of the perimeter edges of the top side of the asset. For example, the insulated boundary area may be disposed along the top side between the grounding element (e.g., gutter) and the perimeter edges.

In an embodiment, the gutter is electrically conductive and electrically grounds charged portions of the liquid that is runoff from the power transfer zone. For example, at least a portion of the gutter is electrically conductive along a surface that is exposed to the liquid runoff. The electrically conductive surface of the gutter is grounded and is in a path of the liquid runoff. As the liquid contacts and flows along the electrically conductive surface of the gutter, charged portions of the liquid are grounded to mitigate any risk of shock. For example, the gutter may be composed of a metal material, such as sheet metal that is uncoated. Optionally, a portion of the gutter may be coated with an electrically non-conductive material, such as conventional paint, while leaving at least a strip of the gutter along an interior surface uncoated, forming a conductive strip. The conductive strip continuously extends around the full length of the gutter to ensure that the charged portions of the liquid contact the conductive strip for grounding the charged portions.

In an alternative embodiment, the drains and/or drainage conduits may ground the charged portions of the liquid, rather than the gutter itself. For example, the drains and/or drainage conduits may include electrically conductive surfaces that are grounded and contact the liquid that flows therethrough to ground the charged portions of the liquid. In this embodiment, the gutter may be electrically non-conductive (e.g., fully dielectric or electrically insulative). For example, the gutter may be a metal material that is fully coated with an insulative material, such as conventional paint or sealant, without defining a conductive strip. In another example, the gutter may be composed of a plastic or other polymeric material that is a dielectric.

In a second alternative embodiment, the grounding element includes the gutter and an electrically conductive layer. The electrically conductive layer may be the thin, flat layer of the grounding element shown in FIG. 1 and/or FIG. 3. As such, the grounding element may include a combination of the embodiments shown in FIGS. 1 and 3 with the embodiment shown in FIG. 5. The electrically conductive layer may have a closed shape that fully surrounds an entire perimeter of the power transfer zone without any breaks. The gutter may surround the electrically conductive layer. In this embodiment, the electrically conductive layer may ground the charged portions of the liquid runoff, and the gutter may collect and route the liquid runoff to a designated location, rather than allow the liquid to flow over the perimeter edges onto the sides of the asset.

FIG. 7 is a flow chart 400 of a method for grounding liquid runoff according to an embodiment. The method may be performed to form the equipment asset according to the embodiments described herein with reference to FIGS. 1 through 6. The method optionally may include more steps than shown, fewer steps than shown, and/or different steps than shown in FIG. 7. At step 402, a grounding element is applied on a top side of a body of an equipment asset. The grounding element is applied to surround a power transfer zone that includes at least an electrically non-conductive top surface. The equipment asset includes one or more current collector rails mounted to the top side of the body within the power transfer zone. The grounding element may be applied such that the grounding element is spaced apart from the current collector rail(s). The grounding element may be positioned to receive liquid that is runoff from the power transfer zone. For example, the liquid runoff may flow onto and across one or more electrically conductive surfaces of the grounding element.

At step 404, the grounding element is electrically connected to a structural element of the equipment asset below the top side to electrically ground the grounding element to the structural element. Because the grounding element is grounded, the grounding element electrically grounds charged portions of the liquid that contact the conductive surface(s) of the grounding element. Grounding the charged portions of the liquid may mitigate the risk of shocks due to conductive surface conditions along the sides of the equipment asset.

Optionally, the method may include forming the electrically non-conductive top surface of the power transfer zone to be at least partially convex for directing the liquid that is within the power transfer zone away from a defined center of the power transfer zone and outward towards the grounding element.

In a first embodiment, the grounding element is applied by depositing a thin, flat layer of an electrically conductive polymer on the top side to surround an entirety of the power transfer zone, or by attaching a thin, flat layer (e.g., sheet or panel) of a metal material on the top side to surround the entirety of the power transfer zone. In a second embodiment, the grounding element is applied by attaching a gutter to the top side. The gutter may be vertically recessed below the power transfer zone to enable the gutter to receive the liquid from the power transfer zone. The gutter may include one or more drains designed to direct the liquid away from the gutter and the top side of the body. The method may include connecting a respective drainage conduit to each of the one or more drains. The drainage conduit(s) may receive the liquid from the gutter through the corresponding drains, and may route the liquid to a designated location.

Several components are described herein as being electrically non-conductive and/or electrically insulative. These components may have low dielectric constants (or high dielectric strengths) which indicate that the materials are poor conductors of electricity. Dielectric constants characterize the ability of a material to store electrical energy. For example, the electrically non-conductive surfaces and materials described herein may have dielectric constants (k) that are no greater than 30, and may be no greater than 10. The electrically non-conductive materials described herein include various dielectric materials, such as plastics, glass, epoxy, and/or the like.

Several components are described herein as being electrically conductive. These components may have electrical conductivity (EC) values greater than $1.0 \times 10^6$ S/m (Siemen per meter), and optionally may have EC values greater than $1.0 \times 10^7$ S/m. The electrical conductivity is based on conductance and is a measure of a material's ability to carry an electric charge (e.g., transmit current).

In at least one embodiment, an equipment asset includes a body, one or more current collector rails, and a grounding element. The body may have a top side and a power transfer zone, which includes at least an electrically non-conductive top surface. The one or more current collector rails may be mounted to the top side of the body within the power transfer zone. The grounding element may be electrically conductive and disposed on the top side of the body. The grounding element may surround the power transfer zone and be spaced apart from the one or more current collector rails. The grounding element may receive liquid that is runoff from the power transfer zone and electrically ground charged portions of the liquid.

The grounding element may include a thin, flat layer of at least one of a metal material or an electrically conductive polymer. The grounding element may surround an entire perimeter of the power transfer zone.

Optionally, the grounding element includes a gutter that receives the liquid from the power transfer zone on the top side of the body and directs the liquid to one or more drains that direct the liquid away from the gutter and the top side of the body.

The grounding element may be vertically disposed below the power transfer zone along the top side of the body. The power transfer zone may be at least partially convex to direct the liquid that is within the power transfer zone away from a defined center of the power transfer zone and outwards towards the grounding element.

Optionally, the equipment asset is a vehicle, and the top side of the body is a roof of the vehicle. The one or more current collector rails may be electrically couplable to at least one of an energy storage device onboard the vehicle or an electric motor onboard the vehicle. The one or more current collector rails may receive electrical power from an external power system to at least one of charge the energy storage device or power the electric motor.

The grounding element may be spaced apart from perimeter edges of the top side of the body. The top side of the body may include an insulated boundary area disposed between the grounding element and the perimeter edges of the top side. The grounding element may be electrically connected to a structural element of the equipment asset below the top side to electrically ground the grounding element to the structural element.

In at least one embodiment, an equipment asset includes a body, one or more current collector rails, and a grounding element. The body may have a top side and a power transfer zone, which includes at least an electrically non-conductive top surface. The one or more current collector rails may be mounted to the top side of the body within the power transfer zone. The grounding element may be electrically conductive and disposed on the top side of the body. The grounding element may surround the power transfer zone and be spaced apart from the one or more current collector rails. The grounding element may include a gutter that receives liquid that is runoff from the power transfer zone and directs the liquid to one or more drains that direct the liquid away from the gutter and the top side of the body. The grounding element may be spaced apart from perimeter edges of the top side of the body such that an insulated boundary area of the top side is disposed between the grounding element and the perimeter edges of the top side.

Optionally, the gutter may be electrically conductive to electrically ground charged portions of the liquid. Alternatively, the gutter may be electrically non-conductive. The grounding element may include an electrically conductive layer along the top side, and the gutter surrounds the electrically conductive layer such that the liquid from the power transfer zone flows across the electrically conductive layer prior to entering the gutter. The grounding element may be vertically disposed below the power transfer zone along the top side of the body.

In at least one embodiment, a method includes applying a grounding element on a top side of a body of an equipment asset. The grounding element may be applied to surround a power transfer zone that includes at least an electrically non-conductive top surface. The equipment asset may include one or more current collector rails mounted to the top side of the body within the power transfer zone. The grounding element may be applied such that the grounding element is spaced apart from the one or more current collector rails to receive liquid that is runoff from the power transfer zone to electrically ground charged portions of the liquid.

Optionally, applying the grounding element on the top side may include applying a thin, flat layer of at least one of a metal material or an electrically conductive polymer on the top side to surround an entirety of the power transfer zone. Applying the grounding element on the top side may include attaching a gutter to the top side. The gutter may be vertically recessed below the power transfer zone to enable the gutter to receive the liquid from the power transfer zone. The gutter may include one or more drains that direct the liquid away from the gutter and the top side of the body. The method optionally includes connecting a respective drainage conduit to each of the one or more drains. The respective drainage conduit may receive the liquid from the corresponding drain.

The method may include electrically connecting the grounding element to a structural element of the equipment asset below the top side to electrically ground the grounding element to the structural element. The method may include forming the electrically non-conductive top surface of the power transfer zone to be at least partially convex for directing the liquid that is within the power transfer zone away from a defined center of the power transfer zone and outward towards the grounding element.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An equipment asset comprising:
a body having a top side and a power transfer zone, the power transfer zone including at least an electrically non-conductive top surface;

one or more current collector rails mounted to the top side of the body within the power transfer zone; and
a grounding element that is electrically conductive and disposed on the top side of the body, the grounding element surrounding the power transfer zone and spaced apart from the one or more current collector rails, the grounding element configured to receive liquid that is runoff from the power transfer zone and to electrically ground charged portions of the liquid, the grounding element comprising a gutter configured to receive the liquid from the power transfer zone on the top side of the body and to direct the liquid to one or more drains that direct the liquid away from the gutter and the top side of the body.

2. The equipment asset of claim 1, wherein the grounding element includes a thin, flat layer of at least one of a metal material or an electrically conductive polymer.

3. The equipment asset of claim 1, wherein the grounding element surrounds an entire perimeter of the power transfer zone.

4. The equipment asset of claim 1, wherein the grounding element is vertically disposed below the power transfer zone along the top side of the body.

5. The equipment asset of claim 1, wherein the power transfer zone is at least partially convex to direct the liquid that is within the power transfer zone away from a defined center of the power transfer zone and outwards towards the grounding element.

6. The equipment asset of claim 1, wherein the equipment asset is a vehicle, and the top side of the body is a roof of the vehicle.

7. The equipment asset of claim 6, wherein the one or more current collector rails are electrically couplable to at least one of an energy storage device onboard the vehicle or an electric motor onboard the vehicle, and the one or more current collector rails are configured to receive electrical power from an external power system to at least one of charge the energy storage device or power the electric motor.

8. The equipment asset of claim 1, wherein the grounding element is spaced apart from perimeter edges of the top side of the body, the top side of the body including an insulated boundary area disposed between the grounding element and the perimeter edges of the top side.

9. The equipment asset of claim 1, wherein the grounding element is electrically connected to a structural element of the equipment asset below the top side to electrically ground the grounding element to the structural element.

10. An equipment asset comprising:
a body having a top side and a power transfer zone, the power transfer zone including at least an electrically non-conductive top surface;
one or more current collector rails mounted to the top side of the body within the power transfer zone; and
a grounding element that is electrically conductive and disposed on the top side of the body, the grounding element surrounding the power transfer zone and spaced apart from the one or more current collector rails, the grounding element including a gutter configured to receive liquid that is runoff from the power transfer zone and to direct the liquid to one or more drains that direct the liquid away from the gutter and the top side of the body,
the grounding element spaced apart from perimeter edges of the top side of the body such that an insulated boundary area of the top side is disposed between the grounding element and the perimeter edges of the top side.

11. The equipment asset of claim 10, wherein the gutter is electrically conductive and is configured to electrically ground charged portions of the liquid.

12. The equipment asset of claim 10, wherein the gutter is electrically non-conductive.

13. The equipment asset of claim 12, wherein the grounding element includes an electrically conductive layer along the top side, and the gutter surrounds the electrically conductive layer such that the liquid from the power transfer zone flows across the electrically conductive layer prior to entering the gutter.

14. The equipment asset of claim 10, wherein the grounding element is vertically disposed below the power transfer zone along the top side of the body.

15. A method comprising:

applying a grounding element that is electrically conductive on a top side of a body of an equipment asset, the grounding element applied to surround a power transfer zone that includes at least an electrically non-conductive top surface, the equipment asset including one or more current collector rails mounted to the top side of the body within the power transfer zone, wherein the grounding element is applied such that the grounding element is spaced apart from the one or more current collector rails and comprises a gutter configured to receive liquid that is runoff from the power transfer zone to electrically ground charged portions of the liquid and to direct the liquid to one or more drains that direct the liquid away from the gutter and the top side of the body.

16. The method of claim 15, wherein applying the grounding element on the top side comprises applying a thin, flat layer of at least one of a metal material or an electrically conductive polymer on the top side to surround an entirety of the power transfer zone.

17. The method of claim 7, further comprising connecting a respective drainage conduit to each of the one or more drains, the respective drainage conduit configured to receive the liquid from the corresponding drain.

18. The method of claim 15, further comprising forming the electrically non-conductive top surface of the power transfer zone to be at least partially convex for directing the liquid that is within the power transfer zone away from a defined center of the power transfer zone and outward towards the grounding element.

\*   \*   \*   \*   \*